(No Model.)
L. O. ORTON.
SAW GUIDE.
No. 288,727. Patented Nov. 20, 1883.
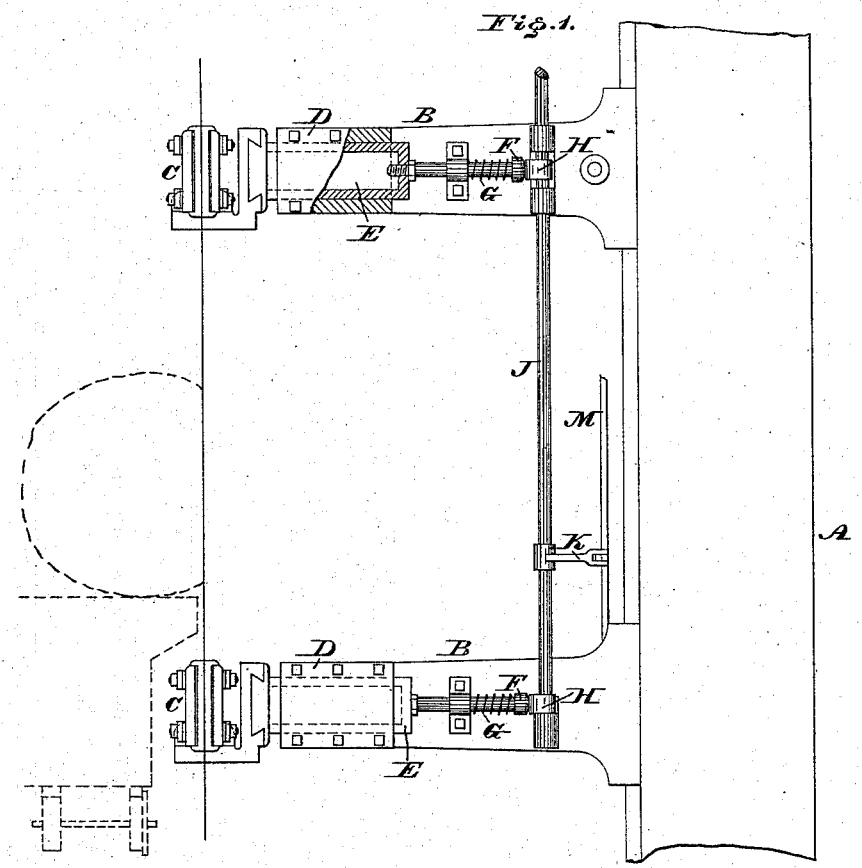
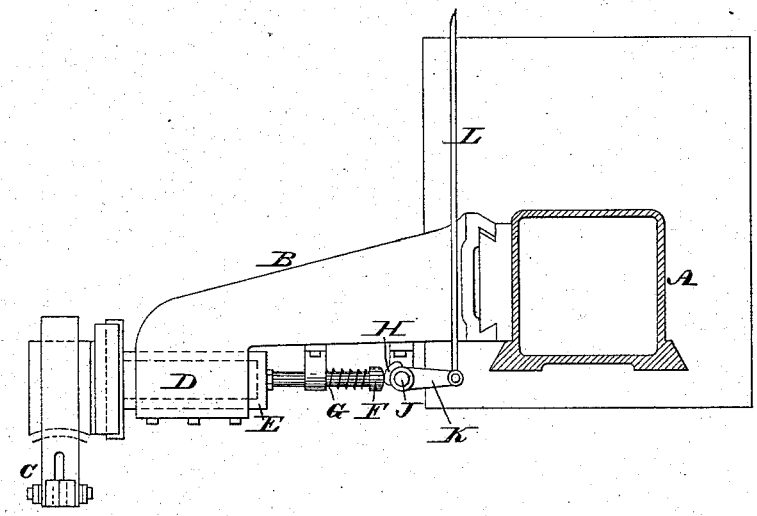
WITNESSES:
A. P. Grant
W. F. Kircher
INVENTOR:
Lyman O. Orton,
BY John A. Wiedersheim
ATTORNEY.

UNITED STATES PATENT OFFICE.

LYMAN O. ORTON, OF PHILADELPHIA, PENNSYLVANIA.

SAW-GUIDE.

SPECIFICATION forming part of Letters Patent No. 288,727, dated November 20, 1883.

Application filed May 28, 1883. (No model.)

*To all whom it may concern:*

Be it known that I, LYMAN O. ORTON, a citizen of the United States, residing in the city and county of Philadelphia, State of Pennsylvania, have invented a new and useful Improvement in Band Sawing Machines, which improvement is fully set forth in the following specification and accompanying drawings, in which—

Figure 1 is a side elevation, partly sectional, of a portion of a sawing-machine embodying my invention. Fig. 2 is a horizontal section thereof in line x x, Fig. 1.

Similar letters of reference indicate corresponding parts in the two figures.

My invention consists of the provision, in a band sawing machine, of means for moving the saw in order to avoid contact with the timber while running back or jigging the carriage on which the same is supported.

Referring to the drawings, A represents the standard of a band sawing machine; and B horizontal arms at the upper and lower ends thereof, supporting the saw-guides C, through which the band-saw moves. Each arm has a horizontally-extending bearing or boss, D, in which is loosely fitted a slide, E, which has a head, F, against which presses a suitably-supported spring, G, the object whereof is to force the guide in the direction toward the standard A, and consequently from the carriage on which the timber is supported.

H represents cams, which are secured to the upper and lower ends of a rotatable rod or shaft, J, and so disposed as to bear on the heads of the slides E, said rod having attached to it a link, K, whereby, by means of a connection, L, and the reversing-lever M of the carriage, the rod J may be operated and the cams H caused to force the guides in the direction from the standard A, and consequently toward the carriage, the guides being thereby firmly held.

It will be seen that by the lateral motion imparted to the guides C in one direction and the adaptability of the saw to follow the same, the saw may be located in order to operate, as usual, as the timber is presented to it. When, however, the carriage is to be run back or returned to its first position, the reversing-lever of the carriage is operated, thus rotating the rod J and moving the cams H, whereby the slides E are released from the holding action of said cams. The springs G are now operative, forcing the guides C immediately in the opposite direction to that first named, or from the carriage, embracing the saw and slightly deflecting it without stopping the running thereof, whereby, as the latter returns, the saw is so removed that contact with the timber is entirely avoided, it being evident that the slightest lateral movement imparted to the saw is sufficient to produce the result stated.

Having thus described my invention, what I claim as new, and desire to secure by Letters Patent, is—

1. In a band sawing machine, the combination, with the saw, of guides between which said saw moves, a sliding connection with said guides, and means for moving said connection, whereby, when said connection is operated, the saw is embraced by the guides and deflected from the path of the timber, substantially as and for the purpose set forth.

2. A saw-guide, in combination with a slide with which said guide is connected, a head attached to said slide, a spring pressing against the head of the slide, and a cam secured to a rotatable shaft and bearing against said head, substantially as and for the purpose set forth.

3. In a sawing-machine, the standard A, with arm B, the saw-guide C, fitted to said arm and connected with said guide, the spring G, pressing against said slide, the cam H, connected with the rotatable shaft J, and bearing against the head of the slide, the link K, connection L, and the reversing-lever M, combined and operating substantially as and for the purpose set forth.

4. In a band sawing machine, a standard with upper and lower arms, in combination with upper and lower guides for the band-saw fitted to said arms, slides connected with said guides, and means for operating said slides, whereby the saw may be embraced and deflected by the guides, substantially as and for the purpose set forth.

LYMAN O. ORTON.

Witnesses:
E. L. MORSE,
JOHN A. WIEDERSHEIM.